(12) United States Patent
Woodall et al.

(10) Patent No.: US 12,030,671 B2
(45) Date of Patent: Jul. 9, 2024

(54) SYSTEM AND METHOD FOR EFFECTOR REBOOT ON AN ELECTRIC AIRCRAFT DURING FLIGHT

(71) Applicant: BETA AIR, LLC, South Burlington, VT (US)

(72) Inventors: Christopher Woodall, Burlington, VT (US); Timothy Gerard Richter, Jeffersonville, VT (US); Michael John Shaw, St. George, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,786

(22) Filed: Oct. 15, 2022

(65) Prior Publication Data
US 2024/0124160 A1    Apr. 18, 2024

(51) Int. Cl.
*B64F 5/60* (2017.01)
*B64C 13/16* (2006.01)

(52) U.S. Cl.
CPC ............... *B64F 5/60* (2017.01); *B64C 13/16* (2013.01)

(58) Field of Classification Search
CPC .................................. B64F 5/60; B64C 13/16
USPC ....................................................... 701/29.1
See application file for complete search history.

(56) References Cited

U.S. PATENT DOCUMENTS

| | | | |
|---|---|---|---|
| 8,260,479 B2 | 9/2012 | Christenson | |
| 8,888,036 B2 | 11/2014 | Chaduc | |
| 9,026,274 B2 | 5/2015 | Hartman | |
| 9,346,542 B2 | 5/2016 | Leng | |
| 9,828,107 B1* | 11/2017 | Ruymgaart | B64D 31/00 |
| 10,836,501 B2 | 11/2020 | Granier | |
| 11,061,397 B2 | 7/2021 | Fenwick | |
| 11,447,030 B1* | 9/2022 | Palombini | B60L 53/66 |
| 11,476,676 B1* | 10/2022 | Lohe | B60L 58/21 |
| 11,549,994 B1* | 1/2023 | Lohe | B64D 27/24 |
| 11,572,183 B1* | 2/2023 | Overfield | B60L 50/66 |
| 11,584,254 B1* | 2/2023 | Foland | G08G 5/0034 |
| 11,597,295 B1* | 3/2023 | Lohe | B60L 3/0046 |
| 11,618,337 B1* | 4/2023 | Palombini | G01R 31/367 |
| | | | 320/109 |
| 2011/0251739 A1 | 10/2011 | Tomas | |
| 2021/0194394 A1 | 6/2021 | Mores | |
| 2022/0009616 A1 | 1/2022 | Galvão | |
| 2022/0194621 A1 | 6/2022 | Kita | |

FOREIGN PATENT DOCUMENTS

| | | |
|---|---|---|
| EP | 3043264 A1 | 7/2016 |
| KR | 102124501 | 6/2020 |
| KR | 102124501 B1 | 6/2020 |

* cited by examiner

*Primary Examiner* — Tyler D Paige
(74) *Attorney, Agent, or Firm* — Brake Hughes Bellermann LLP

(57) ABSTRACT

Disclosed herein is a system and method for effector reboot on an electric aircraft during flight. An effector controller may perform a power on built-in test on boot. An effector controller may selective perform an additional built-in test (ABIT) on boot based on instructions from a flight controller. The flight controller may use flags to indicate the necessity of an ABIT on boot. The effector controller may not perform an ABIT during flight. A backup controller may be used to send standard commands to an effector controller but may not sent an ABIT command.

20 Claims, 7 Drawing Sheets

SYSTEM AND METHOD FOR EFFECTOR REBOOT ON AN ELECTRIC AIRCRAFT DURING FLIGHT

FIELD OF THE INVENTION

The present invention generally relates to the field of electric aircrafts. In particular, the present invention is directed to systems and methods for effector reboot on an electric aircraft during flight.

BACKGROUND

During flight, systems onboard an aircraft must be equipped to deal with sudden failures. Aircrafts may include redundancies such as backup controllers to deal with sudden failures. Additionally, effectors may be rebooted. Solutions to this problem are not satisfactory.

SUMMARY OF THE DISCLOSURE

In an aspect a system for effector reboot on an electric aircraft during flight includes an effector connected to an electric aircraft and comprising an effector controller configured to: perform a power on built-in test (PBIT) on boot, and selectively perform an additional built-in test (ABIT) on boot, a flight controller communicatively connected to the effector and configured to: communicate whether the effector controller is to perform the ABIT upon booting.

In another aspect a method for effector reboot on an electric aircraft during flight includes performing, by an effector controller on an effector connected to an electric aircraft, a power on built-in test (PBIT) on boot, selectively performing, by the effector controller, an additional built-in test (ABIT) on boot, and communicating to the effector controller, by a flight controller, whether the effector controller is to perform the ABIT upon booting.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for effector reboot on an electric aircraft during flight. In an embodiment, effectors may reboot while the aircraft is flying due to malfunction, or the like. Aspects of the present disclosure can be used to run an initial diagnostic test using a PBIT. Aspects of the present disclosure also include a redundant flight controller, the backup controller, to send commands to an effector controller. An additional built-in test may not be performed during flight. Exemplary embodiments illustrating aspects of the present disclosure are described below in the context of several specific examples.

Figure 1:
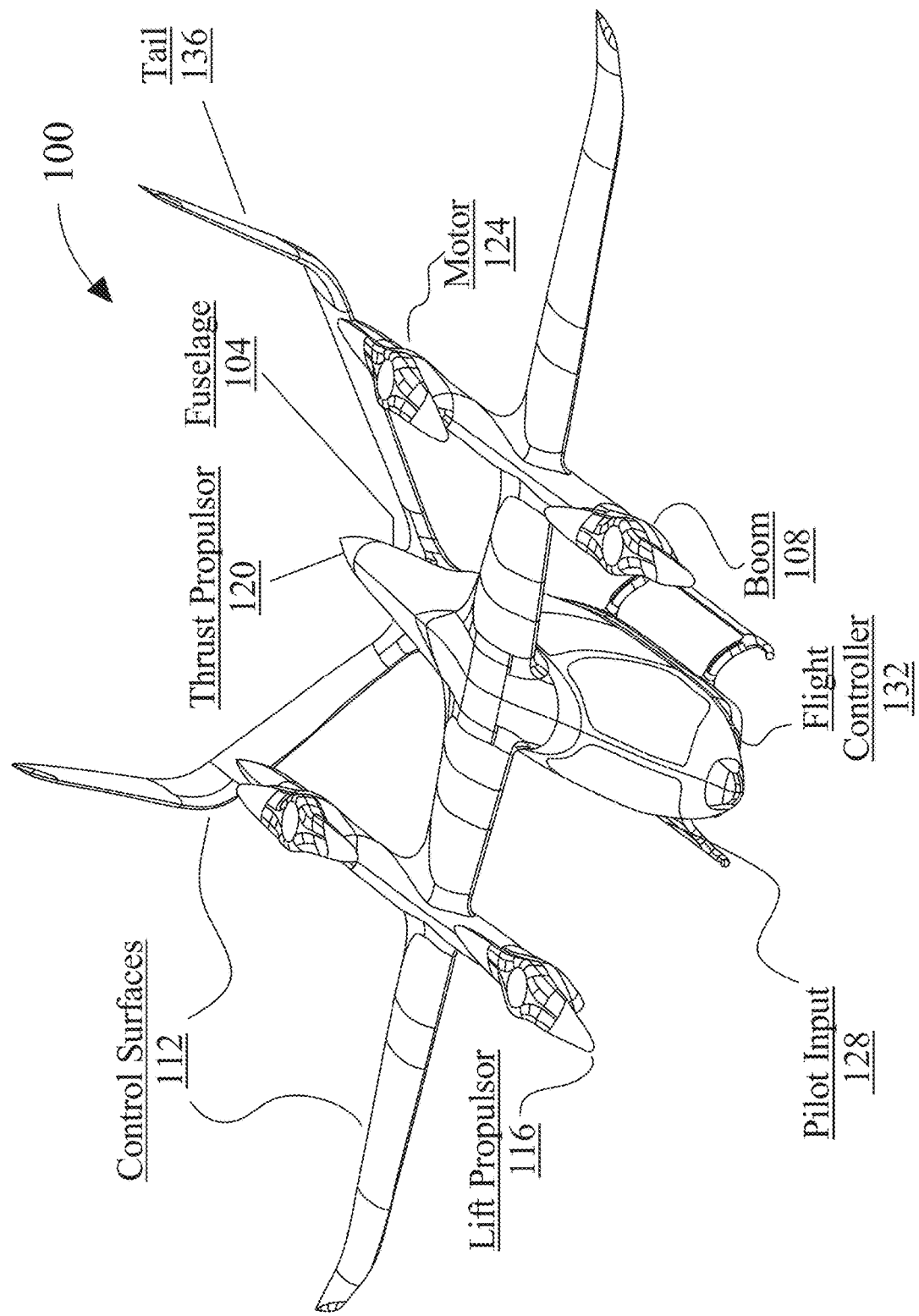
FIG. 1 is an illustration of an exemplary embodiment of an aircraft.

Referring now to the drawings, FIG. 1 illustrates an exemplary embodiment of an electric aircraft 100. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

In an embodiment, and still referring to FIG. 1, a fixed wing may be mechanically attached to fuselage 104. Fixed wings may be structures which include airfoils configured to create a pressure differential resulting in lift. Fixed wings may generally dispose on the left and right sides of the aircraft symmetrically, at a point between nose and empennage. Fixed wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Boom 108 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis.

In an embodiment, and still referring to FIG. 1, a fixed wing may include a plurality of control surfaces 112. As used in the current disclosure, "control surfaces" are aerodynamic devices attached to various points on an aircraft that allow a pilot to adjust and control the aircraft's flight attitude. Control surfaces 112 may be configured to be commanded by a pilot or pilots to change a wing's geometry and therefore its interaction with a fluid medium, like air. In embodiments, control surfaces 112 on a fixed-wing aircraft are attached to the airframe on hinges or tracks so they may move and thus deflect the air stream passing over them. This redirection of the air stream generates an unbalanced force to rotate the plane about the associated axis. There are three primary types of control surfaces 112 an aileron, elevator/stabilator, and a rudder. Control surfaces 112 may comprise flaps, ailerons, tabs, spoilers, and slats, among others. The control surfaces 112 may dispose on the wings and tail in a plurality of locations and arrangements and in embodiments may be disposed at the leading and trailing edges of the wings, and may be configured to deflect up, down, forward, aft, or a combination thereof. In other embodiments, control surfaces 112 may be located on the tail of the aircraft primarily on the trailing edge.

Still referring to FIG. 1, control surfaces may include an aileron. As used in the current disclosure, an "aileron" is a hinged flight control surface usually forming part of the trailing edge of each wing of aircraft. Ailerons are used in pairs (one on each wing) to control the aircraft in roll (or movement around the aircraft's longitudinal axis), which normally results in a change in flight path due to the tilting of the lift vector. Whenever lift is increased, induced drag is also increased. An aileron may include any control surface mentioned in the current disclosure.

Still referring to FIG. 1, control surfaces may include an elevator. As used in the current disclosure, an "elevator" is a moveable part of the horizontal stabilizer, usually hinged to the back of the fixed part of the horizontal tail. Use of elevators control the plain around the pitch axis. The elevators move up and down together. In a non-limiting example, raised elevators push down on the tail and cause the nose to pitch up. This makes the wings fly at a higher angle of attack, which generates more lift and more drag.

Still referring to FIG. 1, control surfaces may include a rudder. As used in the current disclosure, a "rudder" is typically mounted on the trailing edge of the vertical stabilizer, part of the empennage. In a nonlimiting example, deflecting the rudder right pushes the tail left and causes the nose to yaw to the right. The reciprocal of the above mentioned example is also true. Centering the rudder pedals returns the rudder to neutral and stops the yaw.

Still referring to FIG. 1, as used in the current disclosure, a "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 1, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

In an embodiment, and still referring to FIG. 1, lift propulsor 116 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. As used in this disclosure a "lift propulsor" is a component that lifts an aircraft through a medium. In an embodiment, and without limitation, lift propulsor 116 may produce lift as a function of applying a torque to lift propulsor 116. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In some embodiments, lift propulsor 116 may be considered a puller component.

Still referring to FIG. 1, as used in this disclosure a "thrust propulsor" is a component that pushes and/or thrusts an aircraft through a medium. As a non-limiting example, thrust propulsor 120 may include a pusher propeller, a paddle wheel, a pusher motor, a pusher propulsor, and the like. Thrust propulsor 120 may be primarily used in fixed wing-based flight. Thrust propulsor 120 may be located at the rear end of fuselage 104. Additionally, or alternatively, thrust propulsor 120 may include a plurality of pusher flight components. Thrust propulsor 120 is configured to produce a forward thrust. As a non-limiting example, forward thrust may include a force-to-force aircraft to in a horizontal direction along the longitudinal axis. As a further non-limiting example, thrust propulsor 120 may twist and/or rotate to pull air behind it and, at the same time, push aircraft 100 forward with an equal amount of force. In an embodiment, and without limitation, the more air forced behind aircraft, the greater the thrust force with which the aircraft is pushed horizontally will be. In another embodiment, and without limitation, forward thrust may force aircraft 100 through the medium of relative air. Additionally or alternatively, plurality of flight components may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 1, thrust propulsor 120 may include a thrust element which may be integrated into the propulsor. Thrust propulsor 120 may include, without limitation, a device using moving or rotating foils, such as one or more rotors, an airscrew or propeller, a set of airscrews or propellers such as contra-rotating propellers, a moving or flapping wing, or the like. Further, a Thrust propulsor 120, for example, can include without limitation a marine propeller or screw, an impeller, a turbine, a pump-jet, a paddle or paddle-based device, or the like.

In an embodiment and still referring to FIG. 1, a plurality of lift propulsor 116 of plurality of flight components may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 100. In another embodiment, and without limitation, the second set of lift components may be oriented along a line oriented 135° from the longitudinal axis, wherein the first set of lift components line and the second set of lift components are perpendicular to each other.

Still referring to FIG. 1, aircraft 100 may include an electric vertical takeoff and landing aircraft. As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate lift caused by the aircraft's forward airspeed and the shape of the wings and/or foils, such as airplane-style flight. Boom 108 is located on aircraft 100, attached and adjacent to the fuselage 104. As used in this disclosure, a "boom" is an element that projects essentially horizontally from fuselage, including a laterally extending element, an outrigger, a spar, a lifting body, and/or a fixed wing that extends from fuselage 104. For the purposes of this disclosure, a "lifting body" is a structure that creates lift using aerodynamics. Boom 108 may extend perpendicularly to the fuselage 104.

Still referring to FIG. 1, propellors of lift propulsors 116 may be configured to be parked in an aerodynamically efficient manner during fixed wing flight. As used in the current disclosure, the term "parked" refers to the propulsors being placed locked in a position parallel to boom 108 as shown in FIG. 1. Lift propulsors 116 may be used during flight modes that include hovering, vertical take-off and landing, and all rotor-based flight. Lift propulsors 116 will be parked during all fixed wing-based flight modes. In embodiments, a flight controller may signal to lift propulsors 116 that aircraft 100 is in engaged in fixed wing flight. Once this signal is received by lift propulsors 116 the propulsors will be locked into the parked position. In other embodiments, lift propulsors 116 may be parked in any position that is aerodynamically efficient. As used in the current disclosure, "aerodynamically efficient" is a measure of a designs to propensity to generate aerodynamic forces for efficient flight parameters. The most relevant consideration of aerodynamically efficiency is the lift/drag ratio. The propellers parked in a manner consistent with any method disclosed in disclosed in U.S. patent application Ser. No. 17/732,774, filed on Apr. 29, 2022, and titled "SYSTEM FOR PROPELLER PARKING CONTROL FOR AN ELECTRIC AIRCRAFT AND A METHOD FOR ITS USE," the entirety of which is hereby incorporated by reference.

Still referring to FIG. 1, lift propulsors 116 and thrust propulsors 120 may be separate flight components. In embodiments, lift propulsors 116 and thrust propulsors 120 are two separate entities that separately perform the functions of lifting and thrusting aircraft 100 respectively. Separating these functions allows aircraft 100 to operate in a more efficient manner.

Still referring to FIG. 1, aircraft 100 comprises a plurality of motor assembly and at least one boom 108 to house said motor assembly. Motor 124 assembly may be comprised of an electric, gas, etc. motor. Motor 124 is driven by electric power wherein power have varying or reversing voltage levels. For example, motor may be driven by alternating current (AC) wherein power is produced by an alternating current generator or inverter. Lift propulsors 116 and/or thrust propulsors 120 may be attached to a motor 124 assembly. For the purposes of this disclosure, an "electric motor," is a machine that converts electrical energy into mechanical energy. Each electric motor 124 in system 100 includes a stator and at least an inverter. The motors of the current disclosure may be consistent with any motor disclosed in U.S. patent application Ser. No. 17/736,317, filed on May 4, 2022, and titled "PROPULSOR ASSEMBLY POWERED BY A DUAL MOTOR SYSTEM," the entirety of which is hereby incorporated by reference.

In an embodiment, and still referring to FIG. 1, inverter may be configured to supply AC power to an electric propulsion unit (EPU) of aircraft 100. In an embodiment, an EPU may include motors, and propulsors. An EPU may be controlled by an inverter. An "inverter", as used herein, is a frequency converter that converts DC power into AC power. An inverter (also called a power inverter) may be entirely electronic or may include at least a mechanism (such as a rotary apparatus) and electronic circuitry. In some embodiments, static inverters may not use moving parts in conversion process. Inverters may not produce any power itself; rather, inverters may convert power produced by a DC power source. Inverters may often be used in electrical power applications where high currents and voltages are present; circuits that perform a similar function, as inverters, for electronic signals, having relatively low currents and potentials, may be referred to as oscillators. In some cases, circuits that perform opposite function to an inverter, converting AC to DC, may be referred to as rectifiers. Further description related to inverters and their use with electrical motors used on electric VTOL aircraft is disclosed within U.S. patent application Ser. No. 17/144,304 entitled "METHODS AND SYSTEMS FOR A FRACTIONAL CONCENTRATED STATOR CONFIGURED FOR USE IN ELECTRIC AIRCRAFT MOTOR", filed on Jan. 8, 2021 and by C. Lin et al. Additional descriptions related to inverters and electrical motors are disclosed in U.S. patent application Ser. No. 17/197,427 entitled "SYSTEM AND METHOD FOR FLIGHT CONTROL IN ELECTRIC AIRCRAFT" by T. Richter et al. and filed on Mar. 10, 2021.

Figure 2:
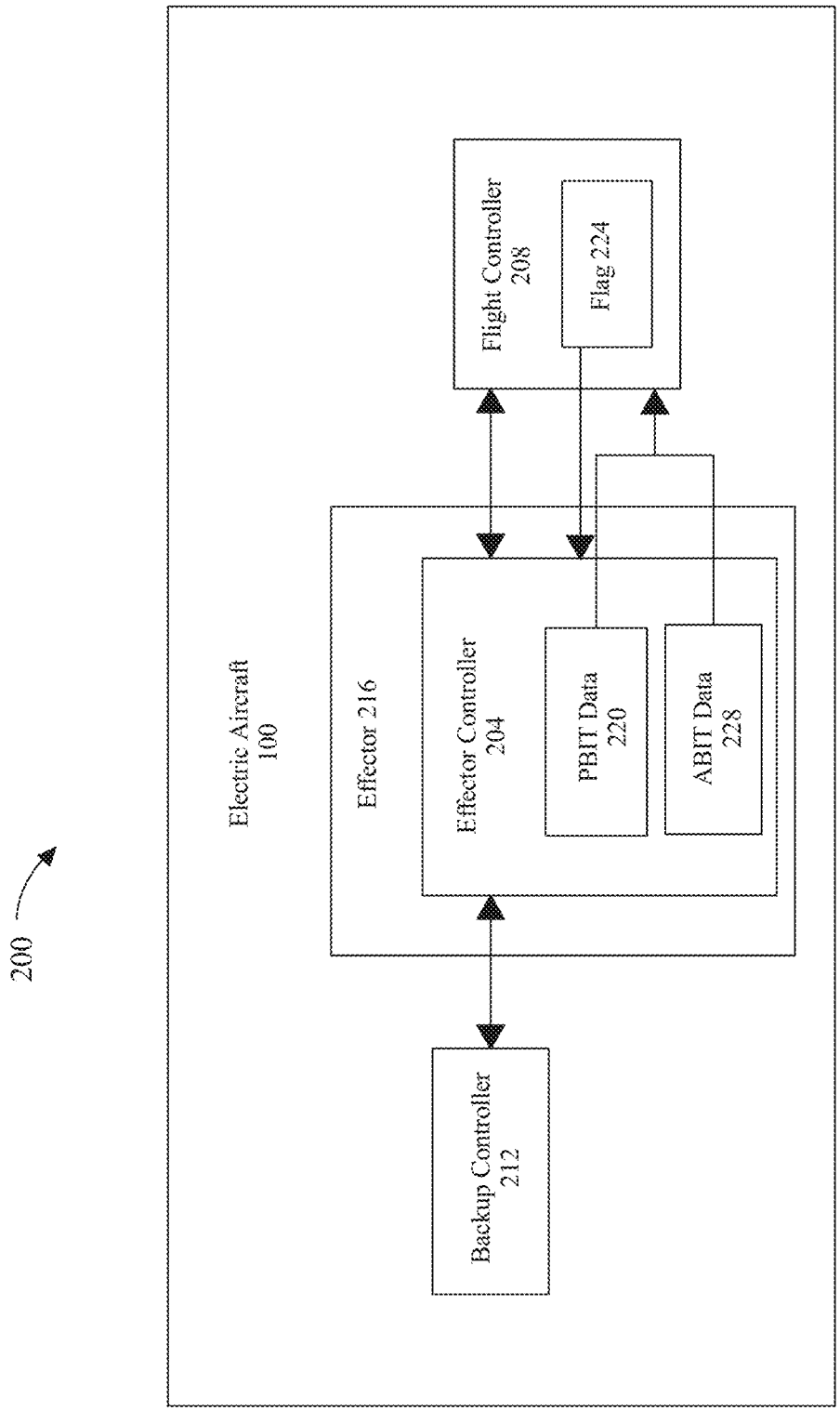
FIG. 2 is a block diagram of an exemplary system for effector reboot on an electric aircraft during flight.

Referring now to FIG. 2, an exemplary embodiment of a system 200 for effector reboot on an electric aircraft is illustrated. System 200 may include an effector controller 204, flight controller 208, and a backup flight controller 212. As used herein, an "effector controller" is a computing device or controller which commands an effector. An effector controller 204 may include an inverter. Inverter may control a motor, or the like, which may be the effector. In some embodiments, an effector controller 204 may include a controller communicatively connected to a control surface actuator. In some embodiments, the control logic of the control surface actuator may be an effector controller 204.

As used herein, a "backup flight controller" is a redundant computing device to the flight controller. A backup flight controller 212 may operate concurrently with flight controller 208. A backup flight controller 212 may operate on its own while flight controller 208 is not available. These controllers 204, 208, and 212 may be computing devices. Controller 204, 208, and 212 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 204, 208, and 212 may include a single computing device operating independently, or may include two or more computing device operating in concert, in parallel, sequentially or the like; two or more computing devices may be included together in a single computing device or in two or more computing devices. Controller 204, 208, and 212 may interface or communicate with one or more additional devices as described below in further detail via a network interface device. Network interface device may be utilized for connecting controller 204, 208, and 212 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 204, 208, and 212 may include but is not limited to, for example, a computing device or cluster of computing devices in a first location and a second computing device or cluster of computing devices in a second location. Controller 204, 208, and 212 may include one or more computing devices dedicated to data storage, security, distribution of traffic for load balancing, and the like. Controller 204, 208, and 212 may distribute one or more computing tasks as described below across a plurality of computing devices of computing device, which may operate in parallel, in series, redundantly, or in any other manner used for distribution of tasks or memory between computing devices. Controller 204, 208, and 212 may be implemented using a "shared nothing" architecture in which data is cached at the worker, in an embodiment, this may enable scalability of system 200 and/or computing device.

With continued reference to FIG. 2, controller 204, 208, and 212 may be designed and/or configured to perform any method, method step, or sequence of method steps in any embodiment described in this disclosure, in any order and with any degree of repetition. For instance, controller 204, 208, and 212 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 204, 208, and 212 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referencing FIG. 2, system 200 includes an effector 216. As used herein, an "effector" is an element that generates a force or moment on an electric aircraft. For example, an effector may include an electric propulsion unit (EPU), actuators, such as those for a control surface, and the like. Control surfaces, and EPUs are discussed in further detail above in FIG. 1. An EPU may include an electric motor, a lift component, a pusher component, and the like. An actuator may control a control surface. For example, an actuator may move an aileron, elevator, or the like. Effector 216 may be connected to electric aircraft 100 (also referred to as "aircraft"). Effector 216 may be mechanically connected to aircraft 100. As used herein, "mechanically connected" refers to the joining of two or more elements by mechanical fasteners such as bolts, rivets, or screws.

With continued reference to FIG. 2, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 2, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 2, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 2, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 2, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Continuing to reference FIG. 2, effector controller 208 is configured to perform a power on built-in test (PBIT) on boot. As used herein, a "PBIT" is a comprehensive, self-diagnostic test. "On boot" refers to when an effector is powered on. In an embodiment, a PBIT may be performed on an initial start up of an effector 216. In another embodiment, a PBIT may be performed on boot of an effector 216 in flight. This may occur when an effector 216 shuts down during flight. "In flight" refers to when an aircraft is in the air. "In flight" may include take-off, cruising, landing, and the like. "In flight" may include vertical and/or horizontal flight. A PBIT may assess behavior and health status of effectors 216. As used herein, "PBIT data" may include data on the health and behavior of effectors 216. In an embodiment, health of an effector may include whether the effector is getting the proper voltage, current, and the like from a power supply. This may ensure that an effector 216 is properly powered on. PBIT data 220 may also include data on read/write faults in memory devices, such as in effector controller 208. PBIT data 220 may also include data on interfaces with other systems, such as electrical connections between effectors 216 and effector controller 208. Data on interfaces with other systems may include a frequency of a stream of data. PBIT data 220 may also include data on communication through CAN buses, which are discussed in further detail below. Communication on CAN buses may include a loopback test to check that the buses are working.

Still referencing FIG. 2, flight controller 208 may receive PBIT data 220 and communicate whether the effector 216 is to perform an additional built-in test (ABIT) upon booting. Effector controller 204 may be communicatively connected to flight controller 208. In an embodiment, flight controller 208 may compare PBIT data 220 to various thresholds to determine if the PBIT data 220 is abnormal or normal. Alternatively, or additionally, effector controller 204 may compare PBIT data 220 to various thresholds. For example, voltages and currents of the effector 216 may be compared to a voltage threshold and current threshold. If the voltage and current in the effector 216 is above or below the threshold, it may indicate that the effector 216 is acting abnormally. In another example, temperatures of effector 216 may be compared to a threshold temperature to determine whether an effector 216 is acting abnormally. In an embodiment, if PBIT data 220 is abnormal, flight controller 208 may communicate to effector controller 204 to run an additional built-in test (ABIT) on boot. Flight controller 208 may only communicate to effector controller 204 to run an ABIT on boot upon an initial startup of the aircraft 100. Flight controller 208 may control the effector controller 204 to not perform the ABIT in flight. An ABIT may not be performed during flight as it is desirable to minimize the amount of time the aircraft 100 is without a booted (powered on) effector 216, such as a propeller, motor, actuator, and the like. In an embodiment, flight controller 208 may broadcast a flag 224 to communicate with an effector controller 204 to run an ABIT on boot. As used herein, a "flag" is a command. A flag 224 may include a binary value representing whether or not to run an ABIT on boot. Flag 224 may also include a predetermined bit or bit sequence that holds a binary value. Flag 224 may indicate the necessity of the ABIT on boot. A flag 224 may be broadcasted through a signal, discussed below. A flag 224 may be broadcasted as a function of PBIT data 220. For example, flag 224 may indicate that an inverter may need to undergo an ABIT. In another embodiment, a flag 224 may indicate that an EPU may need to undergo an ABIT.

Still referencing FIG. 2, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 2, in some cases, system 200 may perform one or more signal processing steps on a signal. For instance, system 200 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Continuing to reference FIG. 2, and as used herein, an "ABIT" is an additional self-diagnostic test following a PBIT. An ABIT may be initiated following a fault detected from a PBIT. In an embodiment, ABIT may include a plurality of self-checks. As used herein, a "self-check" is a function of an ABIT that checks for failures while the system is running. In an embodiment, an ABIT may include extensive tests of individual functions of an effector 216 to determine the origin of a fault. Self-checks may include a BIOS CRC test, an ethernet PHY loopback, hardware checks, and the like. ABIT may also include a memory check. As used herein, a "memory check" is a function of the ABIT that checks whether the controller's memory is functioning properly. In an embodiment, a memory check may check random access memory (RAM). Memory check may check RAM for size, timing, MARCH C test, ECC test, conventional, and the like. Memory check may generate patterns to the memory of an effector electronic systems and read them to log any defects. In an embodiment, effector controller 204 may transmit ABIT data 228 to flight controller 208. Flight controller 208 may reset flag 224 upon receiving ABIT data 228. Resetting flag 224 may entail resetting a request for an ABIT. As used herein, "ABIT data" is information relating to the results of an ABIT. In an embodiment, ABIT data 228 may include any faults discovered, data relating to memory checks, data relating to additional self-checks, and the like.

Continuing to reference FIG. 2, system 200 may further include a backup flight controller 212. Backup flight controller 212 may be communicatively connected to effector controller 204. In an embodiment, backup flight controller 212 may serve as a redundant flight controller to flight controller 208. In the instance where flight controller 208 shuts down, a backup flight controller 212 may take control. In an embodiment, backup flight controller 212 may not communicate to the effector controller 204 to perform an ABIT upon booting. Backup flight controller 212 may communicate to the effector controller 204 other normal commands, such as controller the effector 216, sending commands to fly aircraft 100, and the like. An ABIT may be unnecessary as if the flight controller 208 fails, there is already a failure.

Figure 3:
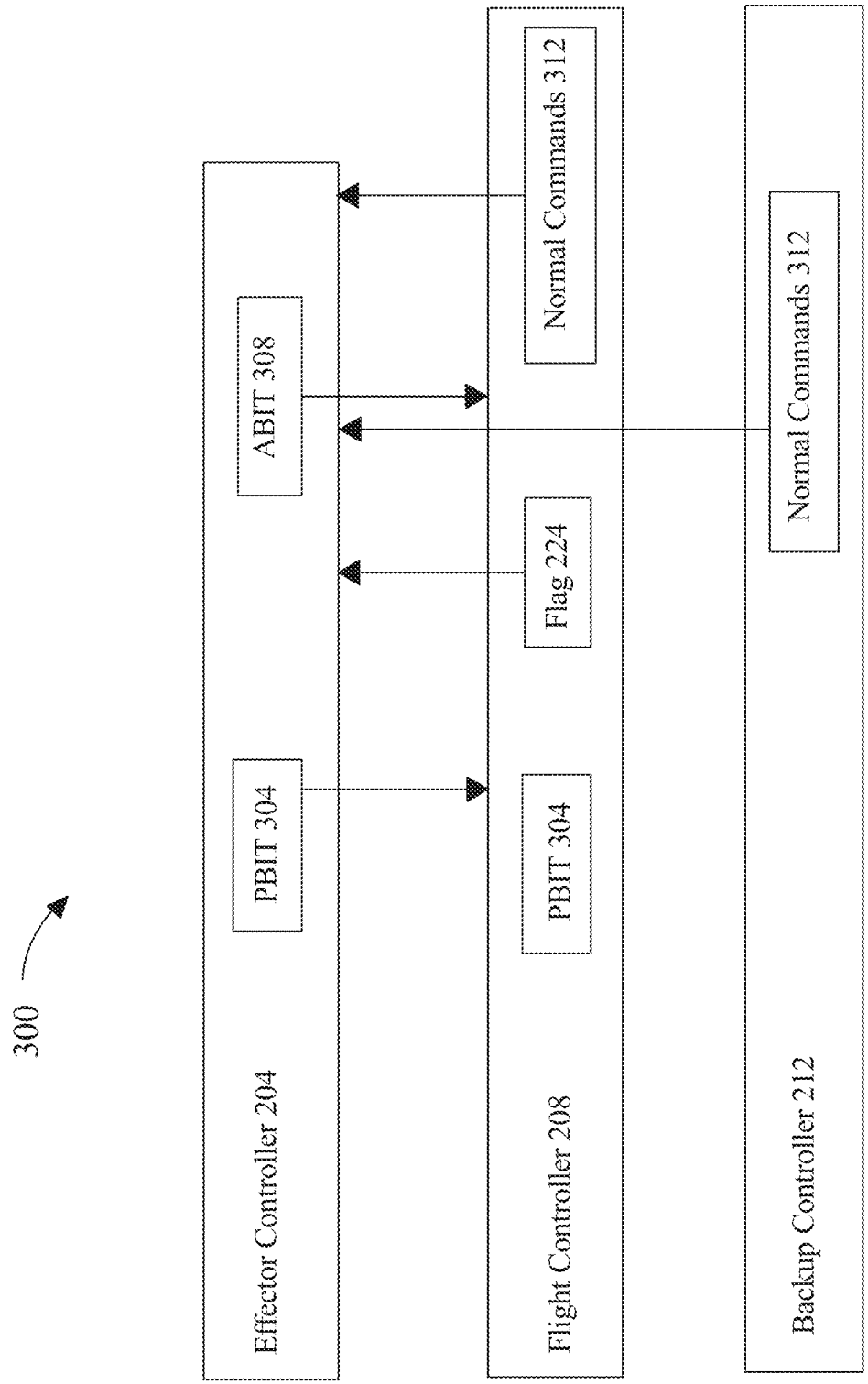
FIG. 3 is a block diagram of an exemplary embodiment of an initial startup of an aircraft.

Now referencing FIG. 3, an exemplary embodiment of an initial startup 300 of aircraft 100. During initial startup 300, effector controller 204 and flight controller 208 may both run a PBIT 304. Then, an ABIT 308 may be run on effector controller 204 if flight controller 208 broadcasts a flag 224 to effector controller 204. The ABIT data may be transmitted back to flight controller 208 such that flight controller 208 may then remove the ABIT broadcast request. After this, flight controller 208 may transmit normal commands 312 to effector controller 204 to run the effector. In an embodiment, a backup controller 212 may be running concurrently to the flight controller 208. Backup controller 212 may run a PBIT and transmit normal commands 312 to effector controller 204. Normal commands may include any command given by a flight controller 208 to an effector controller 204 such as commands for flying the aircraft, controlling the effector, and the like. In an embodiment, commands from backup controller 212 and commands from flight controller 208 may be the same to create redundancy.

Figure 4:
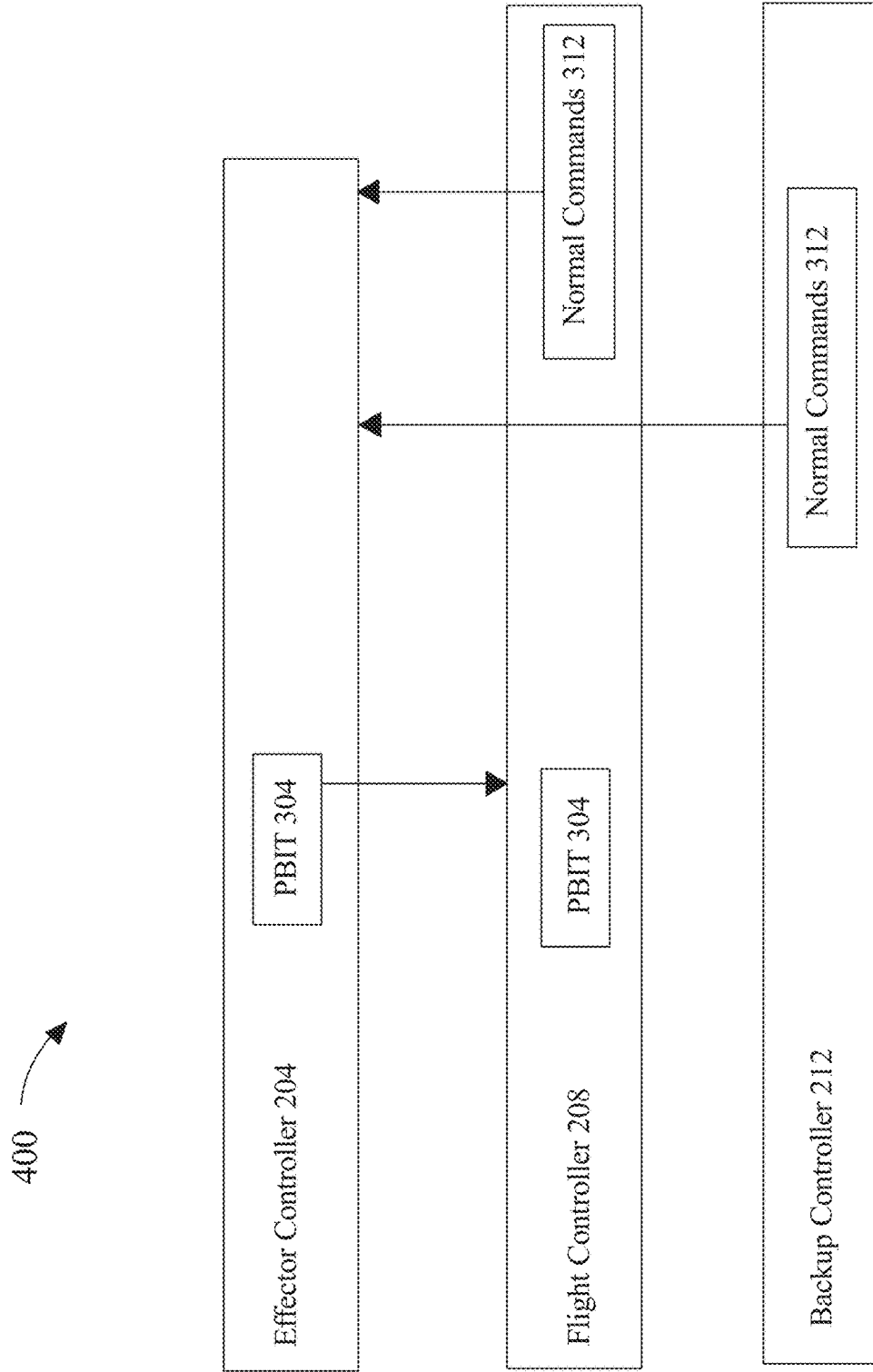
FIG. 4 is a block diagram of an exemplary embodiment of a rebooted effector during flight.

Now referencing FIG. 4, an exemplary embodiment of a rebooted effector during flight 400 is shown. In an embodiment, an effector controller 204 for an effector (shown in FIG. 2) may be restarted during flight. In this embodiment, effector controller 204 may run a PBIT 304 upon rebooting and then receive normal commands from a flight controller 208 and a backup controller 212.

Figure 5:
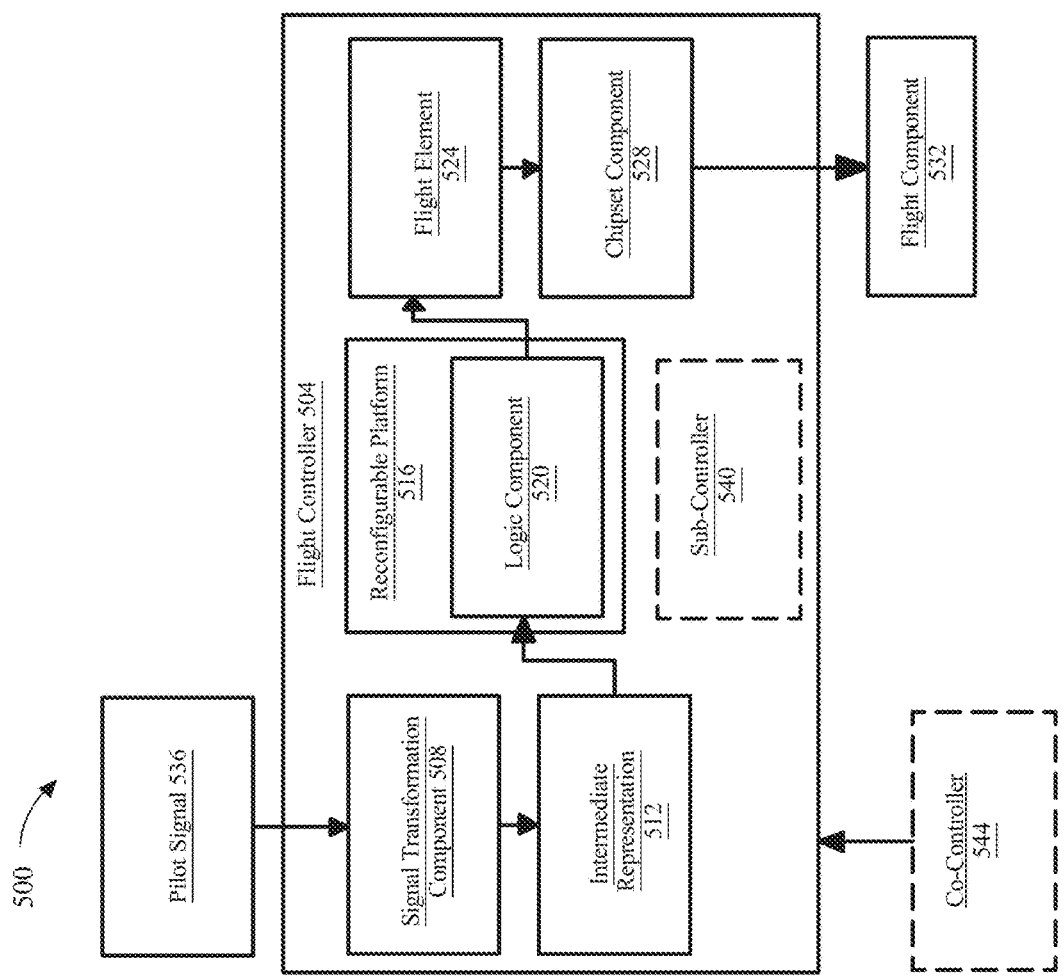
FIG. 5 is a block diagram of an exemplary embodiment of a flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or apparatus on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more apparatus languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or apparatus on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
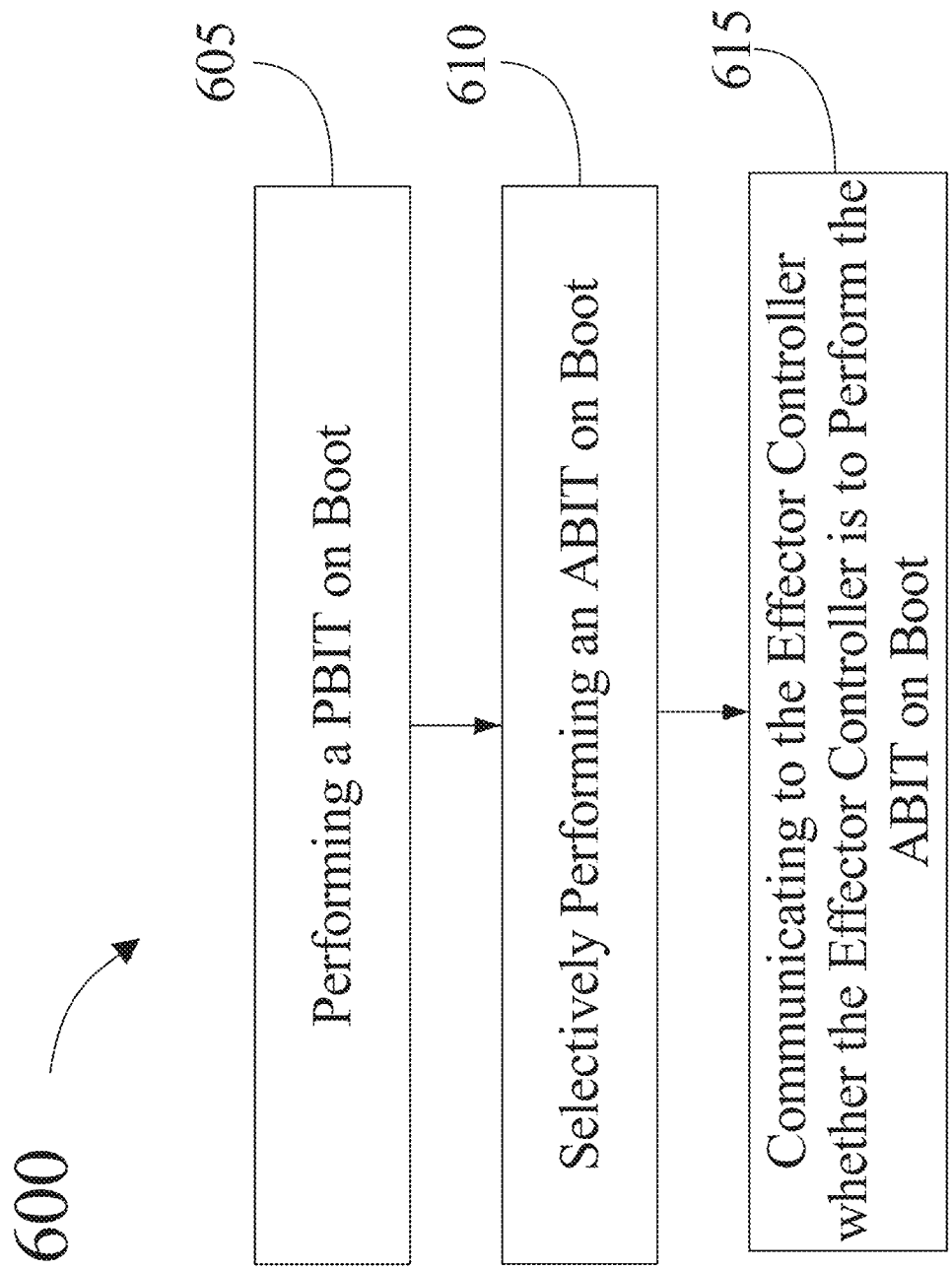
FIG. 6 is a flow diagram of an exemplary method for effector reboot on an electric aircraft during flight.

Now referencing FIG. 6, a method 600 for effector reboot on an electric aircraft during flight is shown. Step 605 of method 600 includes performing, by an effector controller on an effector connected to an electric aircraft, a power on built-in test (PBIT) on boot. Effector may include an inverter. Electric aircraft may include an eVTOL aircraft. This step may be implemented without limitation as described in FIGS. 1-5.

Step 610 of method 600 includes selectively performing, by the effector controller, an additional built-in test (ABIT) on boot. ABIT may include a plurality of self-checks, a memory check, and the like. This step may be implemented without limitation as described in FIGS. 1-5.

Step 615 of method 600 includes communicating to the effector controller, by a flight controller, whether the effector controller is to perform the ABIT upon booting. Flight controller may be configured to control the effector controller to only perform an ABIT during an initial startup of the electric aircraft. Flight controller may be configured to control effector controller to not perform an ABIT in flight. Communicating whether the effector controller is to perform an ABIT may include broadcasting a flag. A flag may indicate the necessity of an ABIT on boot. This step may be implemented without limitation as described in FIGS. 1-5.

Method 600 may also include not communicating, using a backup controller, whether the effector controller is to perform an ABIT upon booting. This step may be implemented without limitation as described in FIGS. 1-5. In an embodiment, a backup controller is a redundant flight controller. Backup controller may run normal commands that a flight controller may run, but a backup controller may not command an ABIT to an effector controller.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
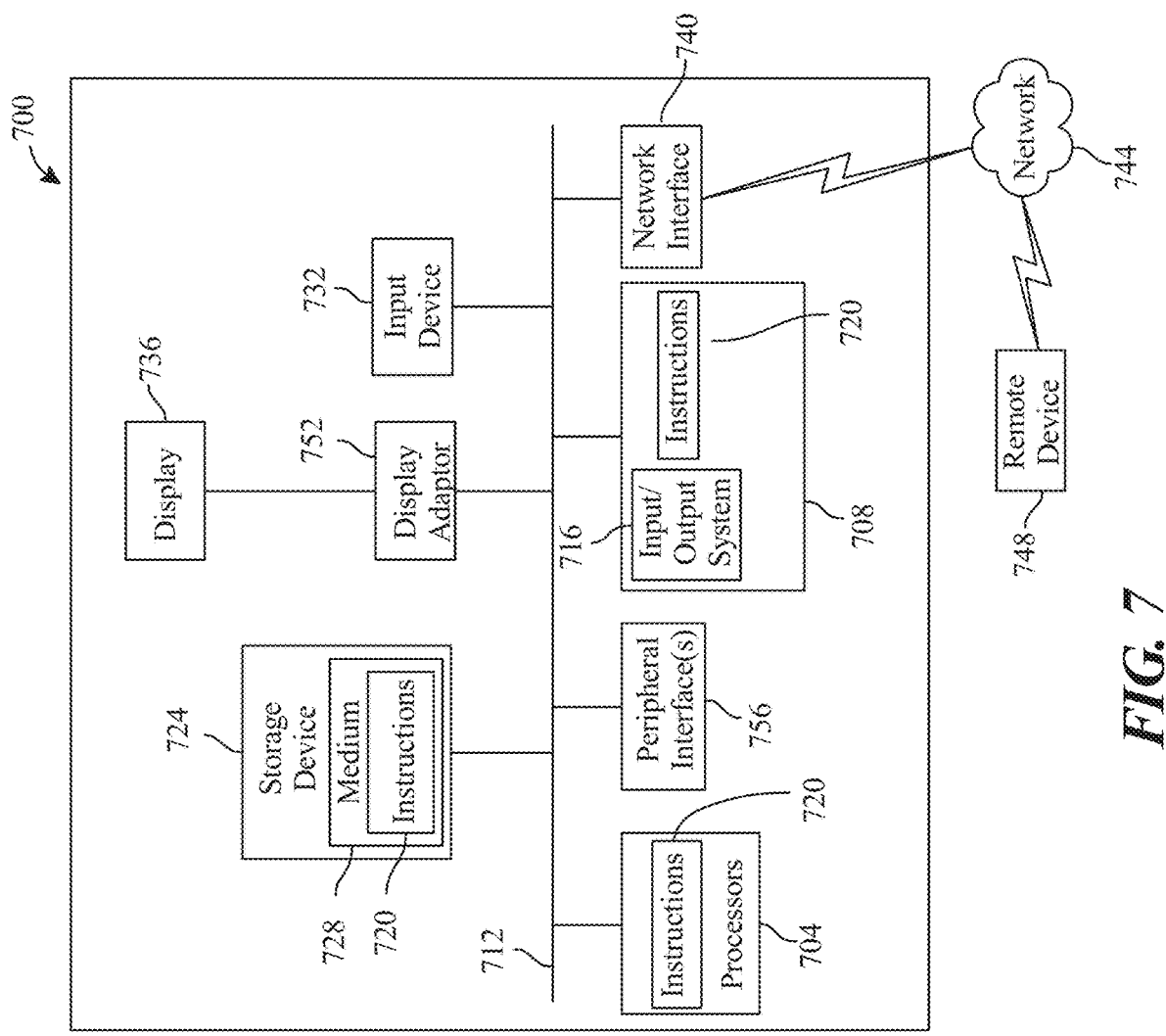
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system comprising:
   an effector connected to an electric aircraft and comprising an effector controller configured to:
      perform a power on built-in test (PBIT) on boot, wherein the PBIT comprises at least an assessment of PBIT data, wherein the PBIT data comprises information on whether the effector is being supplied with a proper current;
      perform an additional built-in test (ABIT) on boot after the PBIT when the PBIT detects a fault, wherein the fault comprises a determination that a current is below a current threshold, wherein the ABIT tests individual functions of the effector to determine an origin of the fault; and
      reboot the effector during flight and run the PBIT on reboot; and
   a flight controller communicatively connected to the effector and configured to:
      perform a comparison of the PBIT data to at least a data threshold, wherein the data threshold comprises at least the current threshold;
      communicate to the effector controller is to perform the ABIT on boot as a function of the comparison; and
      transmit a command to the effector controller after the effector controller is rebooted to run the effector.

2. The system of claim 1, wherein the effector controller comprises an inverter.

3. The system of claim 1, wherein the flight controller is configured to control the effector controller to perform the ABIT only upon an initial startup of the electric aircraft.

4. The system of claim 1, wherein the flight controller is configured to control the effector controller to not perform the ABIT in flight.

5. The system of claim 1, wherein communicating whether the effector controller is to perform the ABIT upon booting comprises broadcasting a flag to the effector controller.

6. The system of claim 5, wherein the flag indicates the necessity of the ABIT on boot.

7. The system of claim 1, further comprising a backup flight controller communicatively connected with the effector controller, wherein the backup flight controller is configured not to communicate whether the effector controller is to perform the ABIT upon booting.

8. The system of claim 1, wherein the ABIT comprises a plurality of self-checks.

9. The system of claim 1, wherein the ABIT comprises a memory check.

10. The system of claim 1, wherein the effector comprises a plurality of lift propulsors.

11. A method comprising:
- performing, by an effector controller of an effector connected to an electric aircraft, a power on built-in test (PBIT) on boot, wherein the PBIT comprises at least an assessment of behavior and health status of effectors and collection of PBIT data;
- selectively performing, by the effector controller, an additional built-in test (ABIT) on boot after the PBIT when the PBIT detects a fault, wherein the fault comprises a determination that a current is below a current threshold, wherein the ABIT tests individual functions of the effector to determine an origin of the fault;
- rebooting, by the effector controller, the effector during flight and performing the PBIT on reboot;
- performing, by a flight controller communicatively connected to the effector, a comparison of the PBIT data to at least a data threshold, wherein the data threshold comprises at least the current threshold;
- communicating to the effector controller, by the flight controller, to perform the ABIT on boot as a function of the comparison; and
- transmitting normal commands to the effector controller after the effector controller is rebooted to run the effector.

12. The method of claim 11, wherein the effector controller comprises an inverter.

13. The method of claim 11, further comprising controlling, by the flight controller, the effector controller to perform the ABIT only upon an initial startup of the electric aircraft.

14. The method of claim 11, further comprising controlling, by the flight controller, the effector controller to not perform the ABIT in flight.

15. The method of claim 11, wherein communicating whether the effector controller is to perform the ABIT upon booting comprises broadcasting a flag to the effector controller.

16. The method of claim 15, wherein the flag indicates the necessity of the ABIT on boot.

17. The method of claim 11, further comprising not communicating, by a backup flight controller communicatively connected with the effector controller, whether the effector controller is to perform the ABIT upon booting.

18. The method of claim 11, wherein the ABIT comprises a plurality of self-checks.

19. The method of claim 11, wherein the ABIT comprises a memory check.

20. The method of claim 11, wherein the effector comprises a plurality of lift propulsors.

* * * * *